US012041915B2

(12) United States Patent
Furusawa

(10) Patent No.: US 12,041,915 B2
(45) Date of Patent: Jul. 23, 2024

(54) APPARATUS FOR SORTING AQUATIC ORGANISMS

(71) Applicant: Homura Heavy Industries Corporation, Takizawa (JP)

(72) Inventor: Yosuke Furusawa, Takizawa (JP)

(73) Assignee: Homura Heavy Industries Corporation (JP)

( * ) Notice: Subject to any disclaimer, the term of this patent is extended or adjusted under 35 U.S.C. 154(b) by 123 days.

(21) Appl. No.: 17/608,455

(22) PCT Filed: Sep. 30, 2019

(86) PCT No.: PCT/JP2019/038632
§ 371 (c)(1),
(2) Date: Nov. 2, 2021

(87) PCT Pub. No.: WO2021/064829
PCT Pub. Date: Apr. 8, 2021

(65) Prior Publication Data
US 2022/0211014 A1 Jul. 7, 2022

(51) Int. Cl.
*A01K 61/90* (2017.01)
(52) U.S. Cl.
CPC .................................. *A01K 61/90* (2017.01)
(58) Field of Classification Search
CPC ........................................................ A01K 61/90
(Continued)

(56) References Cited

U.S. PATENT DOCUMENTS

| 5,123,195 A | 6/1992 | Hawkins |
| 5,327,854 A * | 7/1994 | Smith ..................... A01K 79/02 |
| | | 340/573.2 |

(Continued)

FOREIGN PATENT DOCUMENTS

| CA | 2926663 A1 | 4/2014 |
| CA | 2846271 A1 | 9/2014 |

(Continued)

OTHER PUBLICATIONS

Translation of: JP H0372828 A; Daiku Hiroyuki et al., "Device of Selecting and Pulling up Fishes and Shellfishes" (Year: 1991).*

(Continued)

*Primary Examiner* — Monica L Perry
*Assistant Examiner* — Brittany A Lowery

(57) ABSTRACT

An apparatus for sorting aquatic organisms having different characteristics in accordance with the characteristics, the apparatus including a container configured to contain the aquatic organisms and water, a plurality of electrodes provided in the container, a controller for controlling electric pulses applied to one or more electrodes of the plurality of electrodes, and a driving-out unit for driving out the aquatic organisms having been sorted, wherein the electric pulses controlled by the controller are applied to the one or more electrodes to form an electric field so as to selectively move the aquatic organisms in the container to different portions in the container according to the characteristics, and the driving-out unit drives out the aquatic organisms to an outside of the container from the portion according to the characteristics, after the aquatic organisms are moved.

9 Claims, 6 Drawing Sheets

(58) Field of Classification Search
USPC .................................................. 119/220, 116
See application file for complete search history.

(56) References Cited

U.S. PATENT DOCUMENTS

| | | | | |
|---|---|---|---|---|
| 6,134,824 | A | * | 10/2000 | Gleeson ................ A01K 79/02 43/17.1 |
| 7,028,846 | B1 | | 4/2006 | Johnson |
| 9,596,836 | B2 | * | 3/2017 | Carstensen ............ E02B 1/006 |
| 2019/0264406 | A1 | * | 8/2019 | Furusawa ............... E02B 1/006 |

FOREIGN PATENT DOCUMENTS

| CN | 109310071 A | 2/2019 |
|---|---|---|
| JP | S51-016871 B2 | 5/1976 |
| JP | S52-000878 B2 | 1/1977 |
| JP | H03-072828 A | 3/1991 |
| JP | H05-161448 A | 8/1993 |
| JP | H06-081575 B2 | 10/1994 |
| JP | H07-170899 A | 7/1995 |
| JP | 2003-512847 A | 4/2003 |
| JP | 2004-016170 A | 1/2004 |
| JP | 2017-216988 A | 12/2017 |
| JP | 2019-041742 A | 3/2019 |

OTHER PUBLICATIONS

Extended European Search Report issued Dec. 1, 2022, in EP 19948044.3 filed Sep. 30, 2019, 10 pages.
Office Action for Chinese Application No. 201980096603.7 dated Jul. 5, 2022, 7 pages.
International Search Report for International Application No. PCT/JP2019/038632 dated Dec. 24, 2019, 11 pages.

* cited by examiner

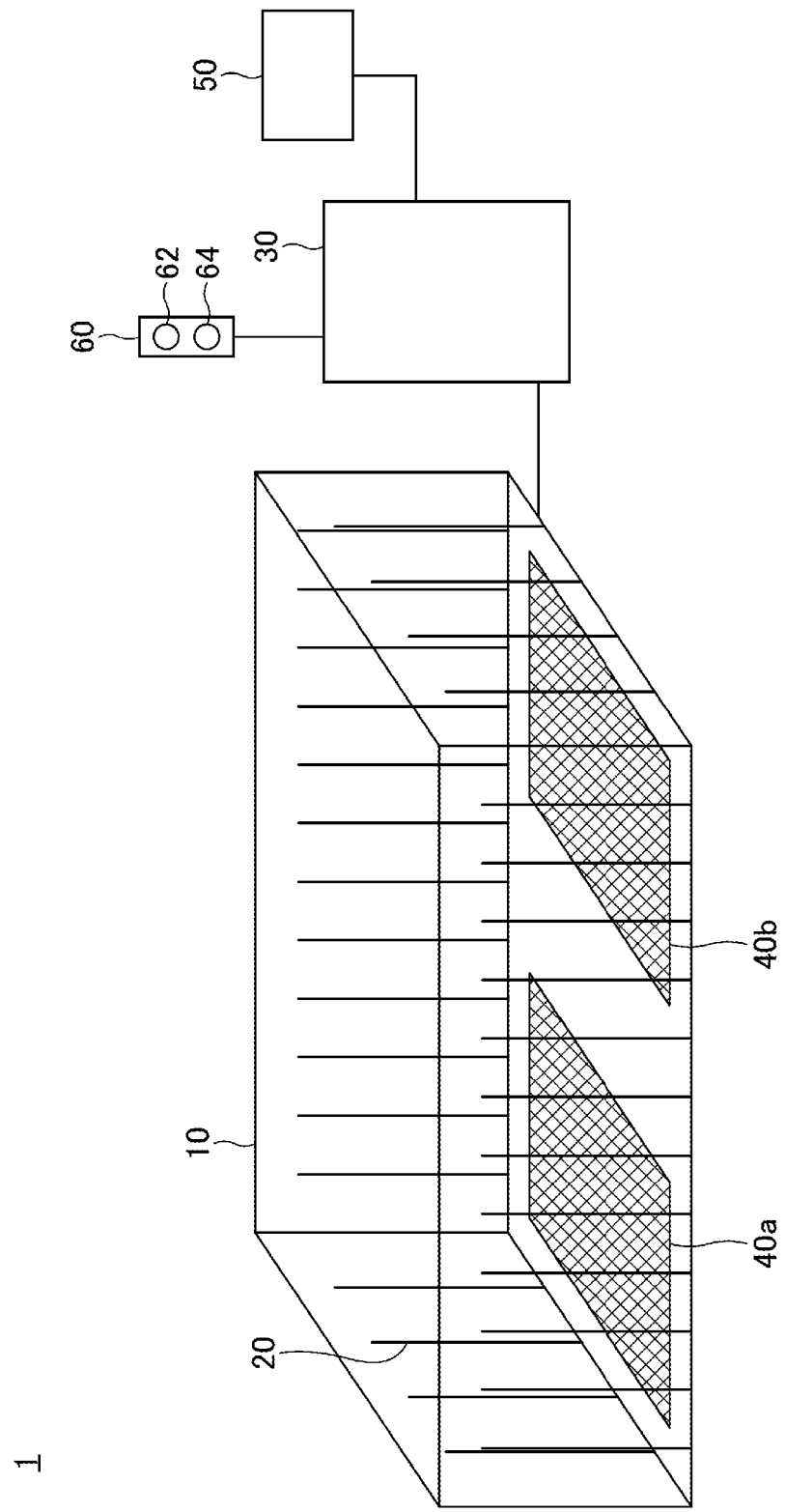

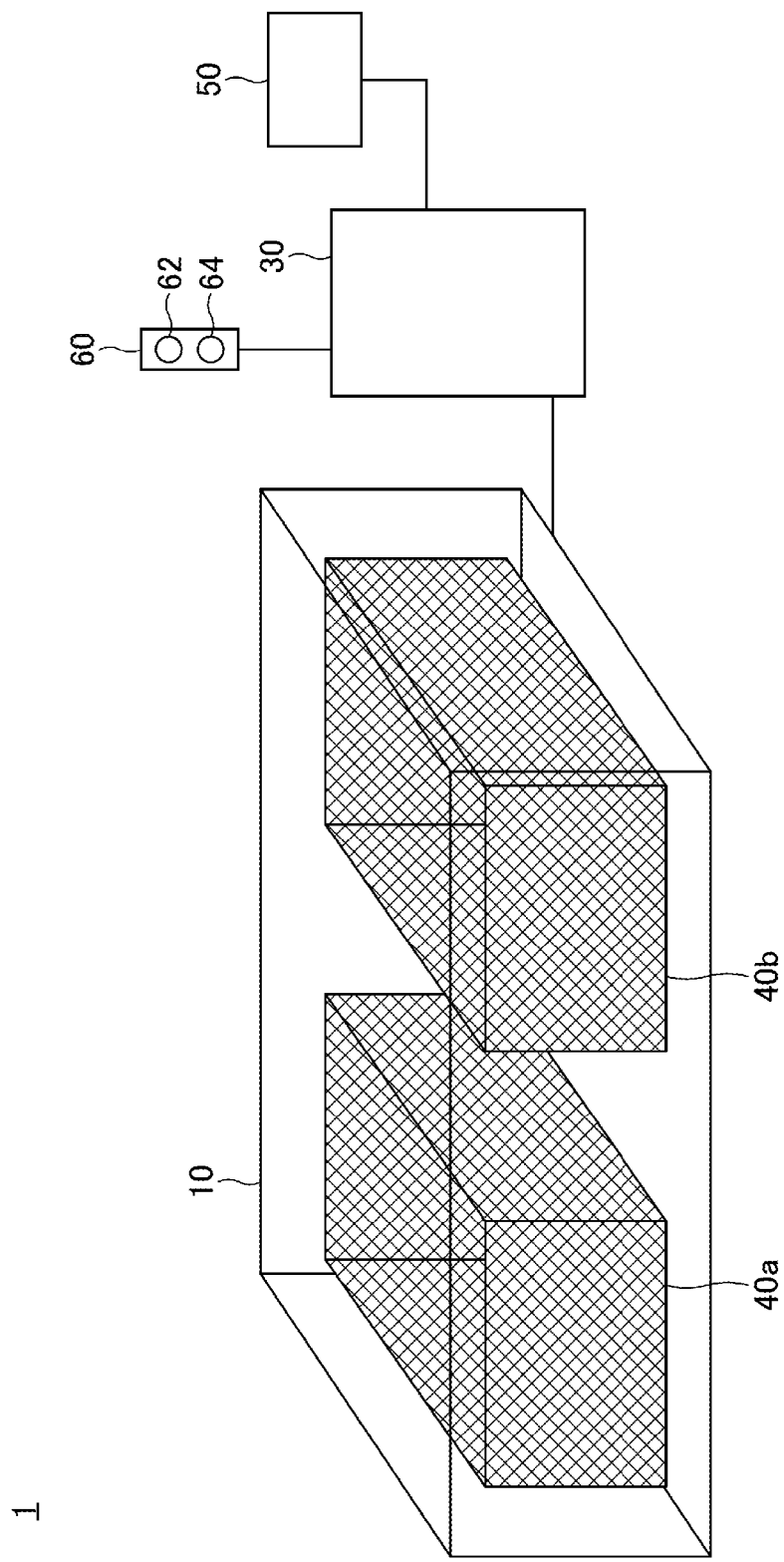

APPARATUS FOR SORTING AQUATIC ORGANISMS

TECHNICAL FIELD

The present invention relates to an apparatus for sorting aquatic organisms.

BACKGROUND ART

When farming aquatic organisms such as fish, it may be necessary to sort aquatic organisms according to their sizes, types, and other characteristics in the raising process of aquatic organisms. Conventionally, such a sorting task is performed manually using a spoon net or the like, or performed automatically, using nets with different mesh sizes or using separators with different opening sizes, according to whether the aquatic organisms can pass through or cannot pass through a mesh or openings (PTL 1 to 3). However, there is a problem in that, regardless of whether the net or the like is used or the separator or the like is used, the surfaces of the aquatic organisms are damaged every time the sorting task is performed because physical contacts with the aquatic organisms occur many times although the degree of contacts may vary. Scratches on the surfaces of aquatic organisms are a major problem because such scratches not only affect the value at the time of shipment but also pose a risk of infectious diseases during the raising process. Also, in the raising process of aquatic organisms, when a more appropriate raising environment is to be provided according to their sizes in order to promote better growth, the sorting tasks are needed to be performed more frequently, which in turn results in a problem of increasing the risk of damage to the surfaces of the aquatic organisms.

CITATION LIST

Patent Literature

PTL 1: Publication of Japanese Patent No. 2004-16170
PTL 2: Japanese Translation of PCT Application No. 2003-512847
PTL 3: Publication of Japanese Patent No. H5-161448

SUMMARY OF THE INVENTION

Therefore, a problem to be solved by the present invention is to enable a sorting task while alleviating damage to the surfaces of aquatic organisms.

In order to solve the above problem, the present invention is an apparatus for sorting aquatic organisms having different characteristics in accordance with the characteristics, the apparatus including a container configured to contain the aquatic organisms and water, a plurality of electrodes provided in the container, a controller for controlling electric pulses applied to one or more electrodes of the plurality of electrodes, and a driving-out unit for driving out the aquatic organisms having been sorted, wherein the electric pulses controlled by the controller are applied to the one or more electrodes to form an electric field so as to selectively move the aquatic organisms in the container to a different portion in the container according to the characteristics, and the driving-out unit drives out the aquatic organisms to an outside of the container from the portion according to the characteristics, after the aquatic organisms are moved. In this case, the characteristics of the aquatic organisms includes a size and/or a type of the aquatic organisms.

The present invention is based on a fact that the aquatic organisms have different sensitivities for stimulation from an electric field in accordance with the characteristics such as the size and/or the type thereof. According to the present invention, an electric field with a different parameter is distributed and generated in a different manner in water in accordance with the characteristics of the aquatic organisms to be sorted, so that the aquatic organisms feel stimulation front an electric field adjusted according to the characteristics of the aquatic organisms and voluntarily moves accordingly. Therefore, aquatic organisms having different characteristics move to respectively corresponding portions according to stimulus from electric fields that are felt by the aquatic organisms. As a result, the aquatic organisms can be sorted according to the characteristics. According to the present invention, pseudo tactile sensations caused by electric fields are used, so that aquatic organisms do not come into contact with obstacles such as a net, a separator, and the like during sorting, and the risk of damaging the surfaces of the aquatic organisms can be significantly reduced. Furthermore, a sorting task can be performed without the risk of damaging the surfaces of the aquatic organisms, so that the sorting task can be performed more frequently, and therefore, according to the characteristics of the aquatic organisms, an appropriate raising environment more suitable for the current situation can be provided.

BRIEF DESCRIPTION OF THE DRAWINGS

FIG. 1 is a figure schematically illustrating a configuration of an apparatus according to an embodiment of the present invention.

FIG. 2 is a drawing illustrating how aquatic organisms are driven out with the apparatus according to the embodiment of the present invention.

MODES FOR CARRYING OUT THE INVENTION

Figure 3A:
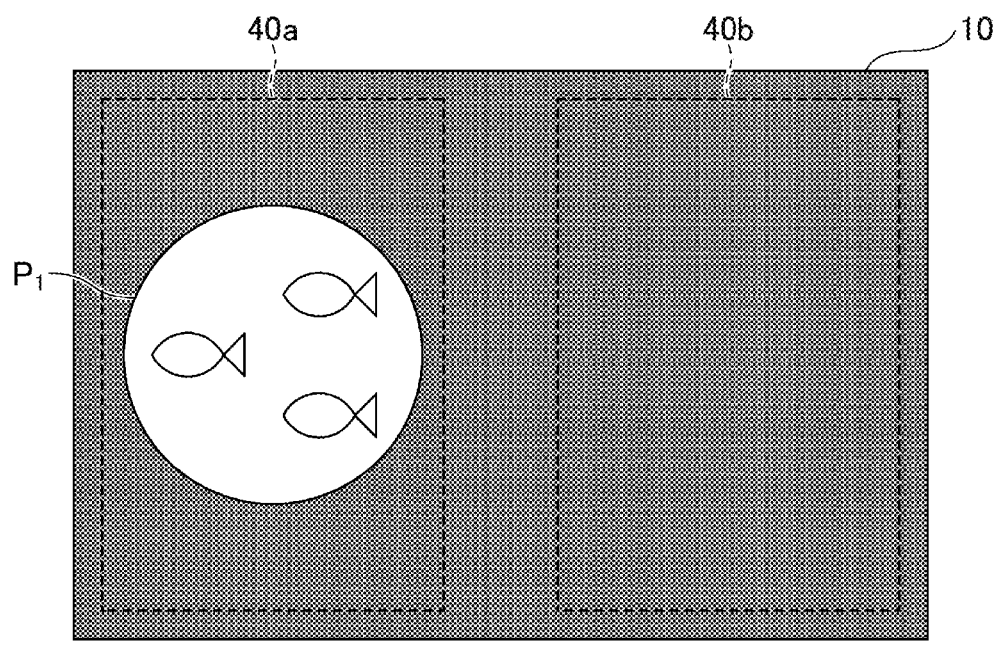
FIG. 3A is a drawing illustrating an example of an electric field formed in a container in the apparatus according to the embodiment of the present invention.

Hereinafter, an embodiment of the present invention will be described in detail with reference to FIGS. 1 to 6. In the embodiment explained in the present specification, fish are explained as an example of aquatic organisms, and a size is explained as an example as a feature of the aquatic organisms. However, the present invention is not limited thereto, and the aquatic organisms include not only fish hut also various organisms such as crustaceans, shellfish, underwater mammals, amphibians staying in water or on water, and reptiles. In addition, the characteristics of the aquatic organisms include various characteristics such as a size and a type (for example, a type of fish).

FIG. 1 is a figure schematically illustrating a configuration of the apparatus according to an embodiment of the present invention. The apparatus 1 according to the present invention is an apparatus for sorting aquatic organisms having different characteristics according to their characteristics. The apparatus 1 includes a container 10 configured to contain aquatic organisms and water, multiple electrodes 20 provided in the container 10, a controller 30 configured to control an electric pulse applied to one or more electrodes of the multiple electrodes, and driving-out units 40a and 40b configured to drive out sorted aquatic organisms.

The present embodiment is explained using an example in which a school of fish constituted by multiple fish of different sizes is put into the container 10, and of the school of fish, relatively small fish are selectively moved to a portion P1 on the left side in the figure, and relatively large fish are selectively moved to a portion P2 on the right side in the figure, so that the fish are classified into a school of relatively small fish and a school of relatively large fish, and each school of fish is driven out by a driving-out device (illustrated as a net in FIG. 1 and FIG. 2). These portions P1 and P2 (also referred to as areas P1 and P2) are portions into which the aquatic organisms that are to be sorted should move, in accordance with the characteristics thereof.

In the embodiment as illustrated in FIG. 1, the container 10 is configured as a substantially rectangular water tank with four side walls and one bottom plate to accommodate aquatic organisms and water, not illustrated. For example, the container 10 can have a transparent side wall such as of glass or acryl so that the inside can be seen. Alternatively, the side wall can be configured to be opaque. When the container 10 is configured as a water tank as in the present embodiment, the container 10 can be installed in an environment where there is no water in the surroundings, such as on land or on a ship. Alternatively, the container 10 may be a compartment formed by a net or the like in open water such as sea or a river. It is sufficient to be able to contain aquatic organisms together with water, and to temporarily limit the range of movement of the aquatic organisms, at least during the sorting operation, to retain the aquatic organisms. In this case, an electric field may be used instead of the net (see WO2017/213233).

In the embodiment as illustrated in FIG. 1, the multiple electrodes 20 are attached to the inner surface of the side wall of the container 10. In FIG. 1, on the inner surface of the side wall of the container 10, the multiple electrodes 20 extending in the substantially vertical direction (the upward-and-downward direction in the drawing) are arranged side by side in parallel to each other. In the embodiment as illustrated in FIG. 1, each electrode 20 is a linear member such as a wire, and is attached to the inner wall surface of the container 10 by, for example, being pasted or embedded. One or more electrodes are selected from these electrodes 20 by the controller 30 described later, and an electric pulse having a parameter set by the controller 30 is applied to each of them, so that the electric field is formed to move the aquatic organisms having different characteristics in the container 10 into the different portions P1 and P2 in the container 10, in accordance with the characteristics thereof.

Although, in the embodiment of FIG. 1, the electrodes 20 are provided on the inner surface of the container 10, the electrodes 20 can be provided not only on the inner surface of the container 10 but also on any portion inside the container 10. For example, the electrodes 20 can also be provided on the bottom of the container 10. Also, the electrodes 20 can be provided in a form of a matrix in the container 10. In the embodiment of FIG. 1, the electrodes 20 are formed in a linear shape extending from the lower end to the vicinity of the upper end of the side wall of the container 10. Alternatively, the electrodes 20 may be distributed in the depth direction. That is, the electrodes 20 may be formed in a dotted shape, a spherical shape, or a relatively short linear shape, and may have a configuration in which the electrodes 20 are interspersed with intervals from each other in the depth direction of the container 10.

A flexible braided wire can be adopted as the electrodes 20. Alternatively, the electrodes 20 may be made of rigid rod-shaped or pipe-shaped wire materials. As the braided wires, a wire obtained by braiding a conductive wire made of stainless steel can be used. Furthermore, instead of or in addition to the wire material made of stainless steel, a wire that is obtained by braiding a wire material made of a conductive material such as platinum, iridium, ruthenium, rhodium, titanium, copper, chromium, carbon, and/or an alloy containing the above may be used. In addition, a conductive polymer material made of polyacetylene, polypyrrole, polythiophene, polyaniline, and the like, and a composite material obtained by adding an inorganic and/or organic (for example, carbon or the like) conductive material to the polymer material can also be adopted. Further, a wire material made of a non-conductive synthetic resin may be combined. By appropriately combining these strands and selecting the ratio thereof, a predetermined conductivity, corrosion resistance, flexibility and/or elasticity of the electrode 20 can be ensured. Further, the above-described braided wire pipe or wire may be coated or plated for corrosion resistance. With this coating for corrosion resistance, the braided wire or pipe may be coated as a whole, or each strand may be coated individually. Further, at least a portion of the surface of the electrode 20 may be conductive and corrosion resistant, and the other portions inside and on the surface of the electrode 20 may be made of a nonconductor such as, for example, plastic and concrete. Similar materials and configurations can be used for rigid wire materials. In view of the ease of installation of the electrodes, whether the electrodes are flexible or rigid may be selected appropriately.

Further, the apparatus 1 as illustrated in FIG. 1 includes the controller 30. The controller 30 is configured to be able to control an electric pulse applied to at least one of the multiple electrodes 20 in the container 10. The controller 30 determines the electrode 20 of the multiple electrodes 20 provided in the container 10 to which the electric pulse is to be applied. The electric pulse may be a predetermined electric pulse of which the parameter has been set for each electrode in advance, or the controller 30 may set, the parameter of the electric pulse that is to be applied to each electrode 20. The controller 30 selects one of the electrodes 20 and applies an electric pulse so as to form an electric field to selectively move aquatic organisms having different characteristics in the container 10 into the different portions P1 and P2 in the container 10, in accordance with the characteristics thereof.

In the embodiment of FIG. 1, the driving-out units 40a and 40b for driving out sorted aquatic organisms are provided on the bottom portion of the container 10. In the present embodiment, the driving-out units 40a and 40b are nets 40a and 40b each formed in a pouch shape having one opening end. At the opening end of each of the nets 40a and 40b, a substantially rectangular frame is attached, and the aquatic organisms are configured to be captured in the nets 40a and 40b when the frames are pulled up (see FIG. 2). As described later, the aquatic organisms are selectively moved into the different portions P1 and P2, in accordance with the characteristics of the aquatic organisms, and accordingly, the nets 40a and 40b are provided at positions corresponding to the portions P1 and P2, respectively. Therefore, after the aquatic organisms are moved by the generated electric field, the aquatic organisms sorted according to the characteristics can be readily confined in the nets 40a and 40b by simply pulling up the nets 40a and 40b. Thereafter, the sorted aquatic organisms are moved out of the container 10 using the nets 40a and 40b.

The driving-out units 40a and 40b can be connected to the controller 30, and are configured to drive driving units such as motors in response to a command signal from the controller 30 to be able to perform pulling up and driving-out operations of the nets.

An electric field generated by applying electric pulses to the electrodes 20 and a movement of aquatic organisms caused by such an electric field are explained with reference to FIG. 3A and FIG. 3B.

The technique of the present invention for sorting aquatic organisms by causing them to voluntarily move to different portions according to the characteristics thereof includes generating an electric field of which the parameter has been adjusted for the water in which the aquatic organisms are present, causing the aquatic organisms to have an illusion of being touched, stimulating sensory nerves/tactile sensations of the aquatic organisms, and in response to this stimulation, for example, inducing the aquatic organisms to voluntarily move from a location where the electric field is stronger to a location where the electric field is weaker. Unlike, for example, an electric fence in a ranch or an electric fence or curtain for preventing fish from approaching a water intake port, such stimulation to sensory nerves/tactile sensations is assumed not to give what is termed as an electric shock to the target aquatic organisms, and not to cause damage in terms of health and aesthetics such as burns and paralysis to the fish.

In this case, the intensity of the stimulation that the aquatic organisms receive from the electric field depends on, for example, the intensity of the electric field as described above and also depends on other parameters such as a frequency and a duty ratio. That is, individual aquatic organisms are different in physical and organism characteristics such as a size, weight, degree of fat, health condition, presence or absence of scales or shells (for shellfish, crustaceans, and the like), organ composition, and the like, depending on the type and the degree of growth. Depending on these characteristics, the aquatic organisms have different sensitivities to various parameters of electric fields. The parameters for more influential electric fields differ depending on the characteristics of the aquatic organisms. For example, smaller fish or a certain type of fish are highly susceptible to an electric field having a higher frequency, and larger fish or another type of fish are highly susceptible to an electric field having a lower frequency.

According to the present invention, by utilizing the above fact, the aquatic organisms can be sorted using the electric fields. Specifically, when aquatic organisms having different characteristics are to be sorted, a first electric field parameter is selected that produces a great difference in the sensitivity for the electric field of the aquatic organisms that are different in terms of the characteristics serving as an index of sorting, and at least two electric fields, i.e., first and second electric fields, that are different in this first parameter are formed in an overlapping manner. In each of these first and second electric fields, a second electric field parameter is distributed in the container, so that the aquatic organisms that are different in terms of the characteristics serving as the index of sorting are moved according to the distribution of the second parameter of any one of the at least two electric fields, whereby the aquatic organisms are sorted.

An intensity (including an amplitude and a bias value), a frequency, a duty ratio, a waveform, or the like can be selected as each of the first and second electric field parameters. The first and second electric field parameters can include different types of parameters. For example, the first parameter can be a frequency and/or a duty ratio. For example, the second parameter may be an intensity.

The distributions of the second parameter in the first and second electric fields are different from each other. That is, the first and second electric fields have different gradients with respect to the second parameter. More specifically, at a certain point in time, the first and second electric fields exhibit the lowest values with respect to the second parameter at different positions in the container 10. The aquatic organisms with different characteristics selectively move so as to gather at the positions where the lowest values are exhibited, whereby the aquatic organisms are sorted.

In other words, the parameter of the electric field from which a different reaction is made by the aquatic organisms that are different in terms of the characteristics serving as the index of sorting can be used as the first parameter. The first and second electric fields that are different from each other in the first parameter are formed in the container 10, and the second parameter can be distributed in a different manner for each of the first and second electric fields. In the first and second electric fields, the minimum points or the maximum points of the distributions with respect to the second parameter can be formed at different positions. The aquatic organisms having the different characteristics can move to the minimum point or the maximum point by reacting to the sensitivity suitable for the aquatic organisms from among the first and second electric fields. In this manner, the aquatic organisms can be classified according to the characteristics.

Figure 3B:
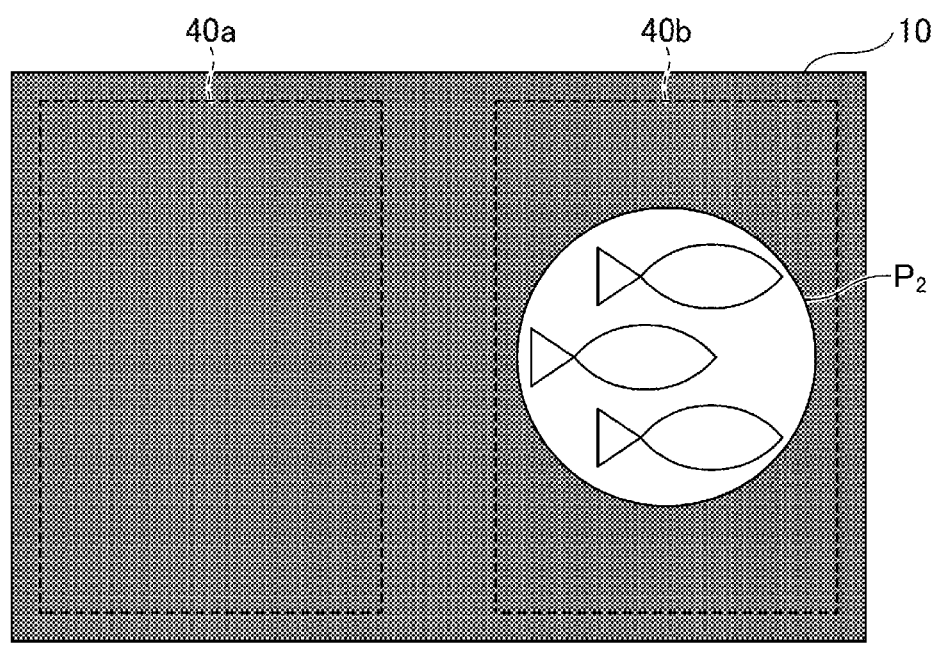
FIG. 3B is a drawing illustrating an example of an electric field formed in a container in the apparatus according to the embodiment of the present invention.

With respect to a single parameter (a first parameter), e.g., a frequency in this case, FIG. 3A and FIG. 3B schematically illustrate an electric field (first electric field) having a value (a frequency) that is more sensitively felt by smaller fish and an electric field (second electric field) having a value (a frequency) that is more sensitively felt by larger fish. In FIG. 3A, and FIG. 3B, areas indicated by gray color, i.e., areas other than the areas P1 and P2 in the container 10 are areas where electric fields are generated (hereinafter referred to as electric field areas of the first and second electric fields), and areas indicated by white color in the areas P1 and P2 are areas where electric fields are not generated (hereinafter referred to first and second non-electric field areas). The electric field formed in the area where the electric field is generated (a first electric field area) outside of the area P1 illustrated in FIG. 3A is set with the frequency (the first parameter) for which smaller fish have higher sensitivity, and the electric field formed in the area where the electric field is generated (a second electric field area) outside of the area P2 illustrated in FIG. 3B is set with the frequency (the first parameter) for which larger fish have higher sensitivity. In this case, the areas P1 and P2 are formed to fit in the inside of the areas above the frames provided on the opening ends of the corresponding driving-out units 40a and 40b, respectively. This is because, when the opening ends of the driving-out units 40a and 40b are pulled upward, all the fish in the areas P1 and P2 are put into the driving-out units 40a and 40b, i.e., the nets, without any left over.

According to the electric field as illustrated in FIG. 3A, smaller fish feel stimulation caused by the electric field outside of the area P1 and do not feel stimulation in the area P1, and therefore, when such an electric field is generated, the smaller fish voluntarily move to the area P1. In this case, when the sorting starts, i.e., when the electric field starts to be generated, the area P1 is formed to be larger, for example, the area P1 is large enough to extend over substantially the entirety of the container 10, and the area P1 is gradually reduced and ultimately, the area P1 is reduced to fit within an area smaller than the space above the driving-out unit 40a, so that smaller fish that had been arbitrarily distributed in the container 10 before the electric field was formed can be finally moved to the area P1 in a smooth and efficient manner.

Conversely, according to the electric field as illustrated in FIG. 3B, larger fish feel stimulation caused by the electric field outside of the area P2 and do not feel stimulation in the area P2, and therefore, when such an electric field is generated, the smaller fish voluntarily move to the area P2. In this case, when the sorting starts, i.e., when the electric field starts to be generated, the area P2 is formed to be larger, for example, the area P2 is large enough to extend over substantially the entirety of the container 10, and the area P2 is gradually reduced and ultimately, the area P2 is reduced to fit within an area smaller than the space above the driving-out unit 40b, so that larger fish that had been arbitrarily distributed in the container 10 before the electric field was formed can be finally moved to the area P2 in a smooth and efficient manner.

The respective electric fields formed outside of the areas P1 and P2 can have uniform intensities. Alternatively, the respective electric fields formed outside of the areas P1 and P2 can be formed so that the intensities decrease toward the area P1 and P2.

When these electric fields as illustrated in FIG. 3A and FIG. 3B are formed in an overlapping manner in the container 10, smaller fish and larger fish can be separately moved to the portions P1 and P2. In this case, in the electric field for the smaller fish (FIG. 3A), the first parameter (for example, a frequency) is set to a value to which the smaller fish are highly sensitive, and in the electric field for the larger fish (FIG. 3B), the first parameter (for example, a frequency) is set to a value to which the larger fish are highly sensitive. Therefore, in the area P1, an electric field to which the smaller fish are highly sensitive is not generated, but an electric field to which the larger fish are highly sensitive is generated, and in the area P2, an electric field to which the larger fish are highly sensitive is not generated, but an electric field to which the smaller fish are highly sensitive is generated. Note that the smaller fish are less sensitive to the parameter of the electric field to which the larger fish are sensitive, and therefore, the smaller fish do not react to the electric field for the larger fish in the area P1. Likewise, the larger fish are less sensitive to the parameter of the electric field to which the smaller fish are sensitive, and therefore, the larger fish do not react to the electric field for the smaller fish in the area P2. Therefore, the smaller fish voluntarily move to the area P1, and the larger fish voluntarily move to the area P2. As a result, the smaller fish and the larger fish are sorted.

Such an electric field is formed by applying electric pulses to the multiple electrodes 20 provided on the inner wall surface of the container 10.

Figure 6:
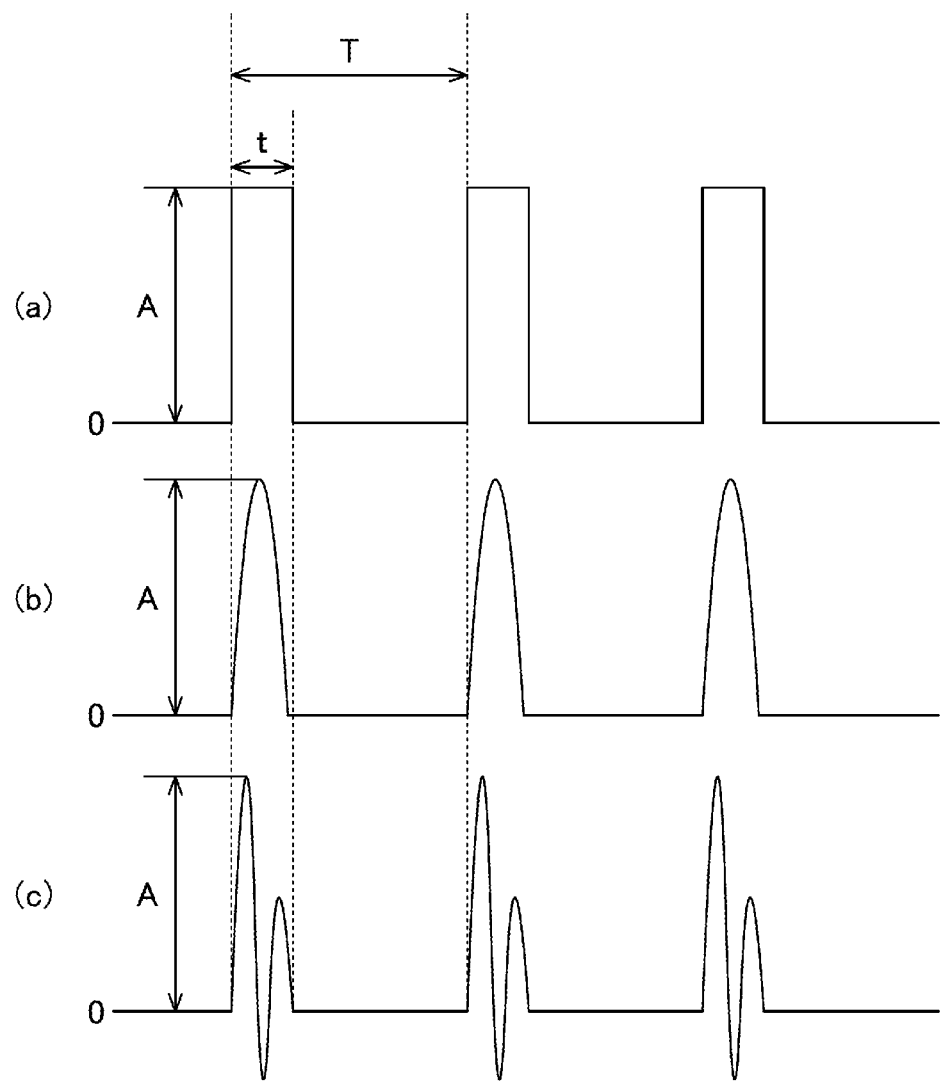
FIG. 6 is a graph illustrating an example of electric pulses applied to electrodes.

FIG. 6 is a graph illustrating an example of electric pulses applied to electrodes 20. For example, an electric pulse as illustrated in (a), (b), or (c) of FIG. 6 is applied to one of multiple electrodes, and in particular, applied to one of electrodes constituting a pair. The other of multiple electrodes is grounded (GND) or brought to a high impedance state (Hi-Z) (a) of FIG. 6 illustrates an example of a square wave. (b) and (c) of FIG. 6 illustrate examples of sine waves. Any of (a) to (c) of FIG. 6 illustrates an example in which an electric pulse with a peak value A [V] or [A] is applied for a duration t [sec] in a cycle T [sec]. Specifically, the duty ratio in this case is D=t/T, and the frequency is 1/T [Hz]. By adjusting these parameters of the peak value, the average voltage or average current, the duty ratio, the frequency, and the like of the electric pulse, the parameters of the electric field that is formed accordingly can be adjusted. In other words, the peak value, the average voltage or average current of the electric pulse is proportional or inverse-proportional to the electric field, and the duty ratio and the frequency of the electric pulse become the duty ratio and the frequency, respectively, of the electric field. Therefore, by adjusting the parameters of the electric pulse applied to the electrode, the parameters of the electric field generated due to the electric pulse are adjusted, and accordingly, the intensity of the stimulation given to the aquatic organisms can be adjusted.

These parameters can be set so as to attain a stimulation appropriate for the characteristics of the aquatic organisms to be sorted. These parameters can be adjusted and determined in view of individual characteristics such as a size, the degree of growth, and the like of a living organism group to be sorted, the type of aquatic organisms to be sorted, characteristics unique to that type (physical and organism characteristics such as presence or absence of scales or shells, organ composition, and the like), an activity state of aquatic organisms to be sorted (for example, whether day or night), the components of the surroundings (for example, freshwater, brackish water, seawater, and the like), and the balance thereof (for example, a ratio of art impedance of aquatic organisms to be sorted to an impedance of water in the container 10). In this manner, by giving an appropriate stimulation to a desired organ of aquatic organisms to be sorted, the aquatic organisms can be moved to a different portion according to the characteristics of the aquatic organisms.

(c) of FIG. 6 illustrates an example in which a sine wave whose peak value A gradually decreases is applied during the duration t. In (c) of FIG. 6, the maximum peak value is indicated aa a representative value of the peak value A. In this manner, the peak value A may vary within the duration t. Also, even in a case where the peak value A is negative, the average voltage or average current is derived from an average value of the effective value. In this case, the frequency at which intermittently applied electric pulses are repeated is referred to as a cycle T, and the frequency of voltage/current applied within a single electric pulse, i.e., the frequency of the sine wave illustrated in, for example, (b) and (c) of FIG. 6 is referred to as a frequency. The voltage/current value of a duration of the cycle T in which no electric pulse is applied may be zero, or a bias voltage/current of a direct current or alternating current may be applied. Also, it may be considered that a very small current/voltage component of a direct current or alternating current may be superimposed. Furthermore, these parameters, especially with regard to the frequency, can be varied within a predetermined width (for example, varied in a cyclic manner within a range of f±x %) by using, for example, a normal distribution function and the like. These waveforms are merely exemplary, and are not intended to limit the present invention.

In the present embodiment, the multiple electrodes 20 are arranged substantially in parallel to each other on the inner wall surface of the container 10. In such an electrode arrangement, by appropriately selecting an electrode to which the above electric pulse is applied, for example, an electric field having any given distribution as illustrated in FIG. 3A and FIG. 3B can be formed.

Explanation is made in detail with reference to FIGS. 1 to 3. For example, as the simplest example, in the container 10 as illustrated in FIGS. 1 to 3, in a case where an electric field is to be formed only in the right half, the electric pulse can be applied to the electrodes arranged in the right half of the container 10. In this case, at least two electrodes are selected as a pair from among the multiple electrodes arranged in the right half, with application to one of the electrodes of the electric pulse as described above and the other of the electrodes being grounded (GND) or brought to a high impedance state (Hi-Z). Electrodes constituting pair are successively selected from among the multiple electrodes arranged in the right half, and an electric pulse is applied, so that an electric field can be formed in the right half of the container 10.

At least two electrodes selected as a pair are selected not only from the electrodes arranged on the same side surface of the container 10 but also from electrodes arranged on different side surfaces. Specifically, the two electrodes may include electrodes arranged on side surfaces facing each other and electrodes arranged on side surfaces connected to each other to form a corner.

When aquatic organisms are sorted by the apparatus 1, water is contained in the container 10. Therefore, when an electric pulse is applied across electrodes 20 constituting a pair, the electricity mainly propagates through water in the container 10 across the shortest distance between the electrodes constituting the pair. In other words, an electric field is generated in proximity to the straight line connecting between the electrodes constituting the pair.

Therefore, for example, in a case where an electric field having non-electric field areas P1 and P2 in a substantially circular shape as illustrated in FIG. 3A and FIG. 3B is to be formed, electrodes can be selected in such a manner that a straight line connecting between the electrodes constituting a pair does not pass through the areas P1 and P2. In a case where an electric field is formed so that the electric field intensity decreases in accordance with closeness to the non-electric field areas P1 and P2, the distance between non-electric field area and the straight line connecting between the electrodes constituting a pair is derived, and the intensity of the electric pulse is adjusted in accordance with this distance, whereby the intensity of the electric field can be adjusted.

Electric pulses can be applied by successively selecting these electrode pairs so as to cover the area where the electric field is to be formed. Alternatively, electric pulses can be applied simultaneously by selecting multiple electrodes pairs.

In order to generate electric fields that are different in the above-described first parameter (i.e., frequency), corresponding parameters of the applied electric pulses can be set differently as appropriate.

In a case where the arrangement of the driving-out units 40a and 40b is fixed, the positions of the non-electric field areas P1 and P2 are accordingly determined in advance, and therefore, the electrode pair to which an electric pulse is to be applied can also be determined in advance. When the arrangement of the driving-out units can be changed as desired, the positions of the non-electric field areas P1 and P2 are to be changed accordingly, and the controller can be configured to derive electrodes constituting a pair, on the basis of the arrangement and the shapes of the non-electric field areas.

Figure 4:
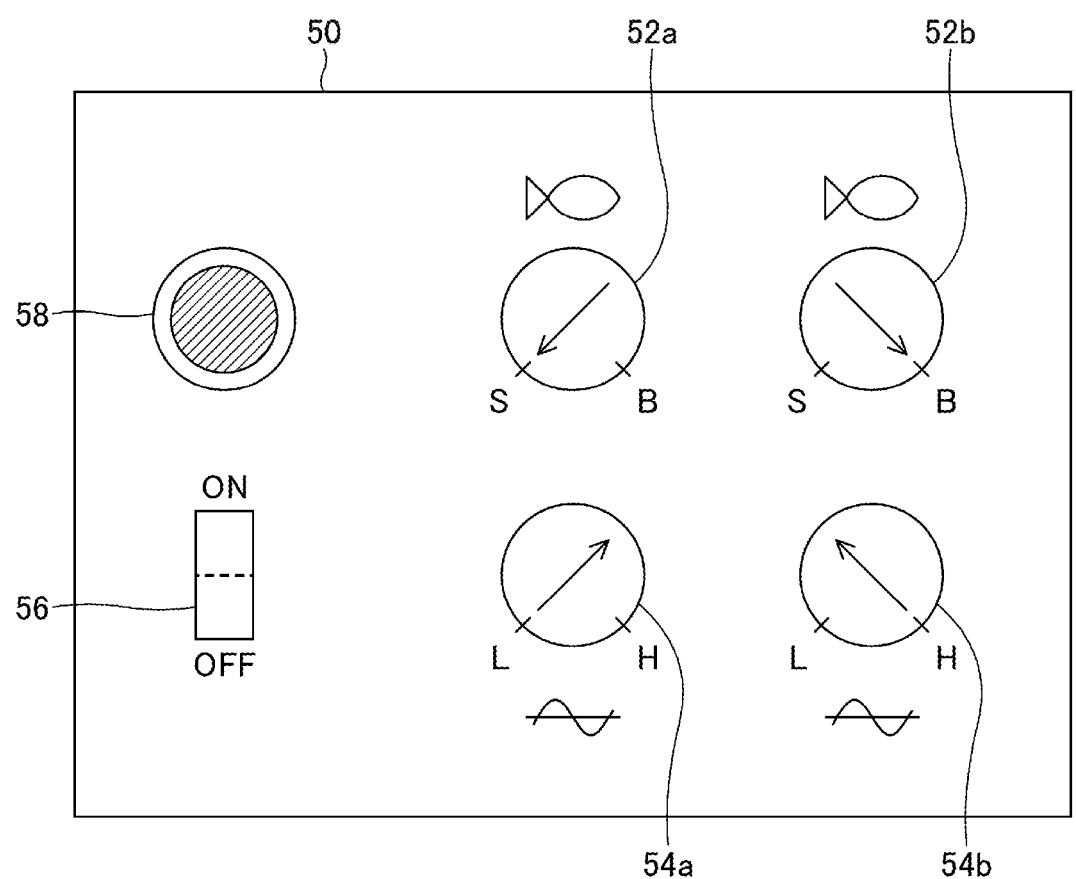
FIG. 4 is a drawing illustrating an example of an operation unit of the apparatus according to the embodiment of the present invention.

The apparatus 1 according to the present invention is further provided with an operation unit 50. FIG. 4 illustrates an operation panel serving as the operation unit 50 for inputting a command into the controller 30. The operation unit 50 is connected to the controller 30, and includes command units 52a to 54b associated with the areas P1 and P2, respectively. The command units 52a to 54b are switches for designating the above-described first and second parameter for the first electric field for forming the area P1 and the second electric field for forming the area P2. In FIG. 4, the command units 52a to 54b are illustrated as rotary dials.

The operation panel of the operation unit 50 may be provided in a fixed manner at a predetermined position of the apparatus 1. In the command units 52a to 54b illustrated as four rotary dials in FIG. 4, two dials are arranged in association with the arrangement of the driving-out units 40a and 40b, respectively. Specifically, the dials 52a and 54a in the left-side column correspond to the electric field as illustrated in FIG. 3A for the driving-out unit 40a on the left side of the container 10, and the dials 52b and 54b of the right-side column correspond to the electric field as illustrated in FIG. 3B for the driving-out unit 40b on the right side of the container 10.

The dials 52a and 52b are dials for designating the sizes of the aquatic organisms that are to be collected at the positions of the driving-out units 40a and 40b, respectively. The user can set the dials 52a and 52b to a desired position between "S" on the left side and "B" on the right side. The parameter (the first parameter) of the electric field is set so that smaller fish gather at the positions of the driving-out units 40a and 40b when the dials 52a and 52b, respectively, are turned left, and so that larger fish gather at the positions of the corresponding driving-out units 40a and 40b when the dials 52a and 52b, respectively, are turned right. Therefore, when the dial 52a is turned to "B" on the right side, and the dial 52b is turned to "S" on the left side, then, larger fish are gathered at the driving-out unit 40a on the left side, and smaller fish are gathered at the driving-out unit 40b on the right side.

The dials 54a and 54b are dials for designating the intensities of the electric fields for forming the areas P1 and P2 corresponding to the driving-out units 40a and 40b, respectively. When the dials 54a and 54b are turned to "L" on the left, the intensities of the electric fields decrease, and when the dials 54a and 54b are turned to "H" on the right, the intensities of the electric fields increase.

The operation unit 50 is further provided with a main power source button 56 and an emergency stop button 58. With the main power source button 56, the main power source of the apparatus 1 can be turned ON and OFF. Furthermore, since the emergency stop button 58 is provided, the power source of the apparatus 1 can be turned. OFF in case of emergency. Furthermore, the operation unit 50 can be provided with an ON/OFF switch for turning ON and OFF the application of the electric pulse to the electrode 20. When such an ON/OFF switch is provided, various kinds of parameters are set, with the operation panel in advance, and thereafter, with the ON/OFF switch, the application of the electric pulse to the electrodes can be turned ON and OFF.

The apparatus 1 further includes a display unit 60 indicating whether electric pulses are applied to the electrodes 20. The display unit 60 may have a red lamp 62 and a green lamp 64.

For example, the green lamp may be configured to be illuminated when the main power source is in the ON state (the main power source button 56 is in the ON state), and the red lamp may be configured to be illuminated when electric pulses are applied to the electrodes (the ON/OFF switch is in the ON state). The display unit 60 is provided at a position that can be seen from the vicinity of the container 10 and the operation unit 50, and can be configured so that the energization state of the apparatus 1 is displayed and notified to persons around the apparatus 1. Alternatively or in addition, the power source state and/or the energization state of the apparatus 1 can be notified by using sounds of a buzzer, a melody, and the like.

In the present embodiment, the operation unit is shown as an example of a hardware operation panel with dials and the like, but the operation unit can also be implemented by software. In this case, the operation unit can also be displayed on the monitor.

Figure 5:
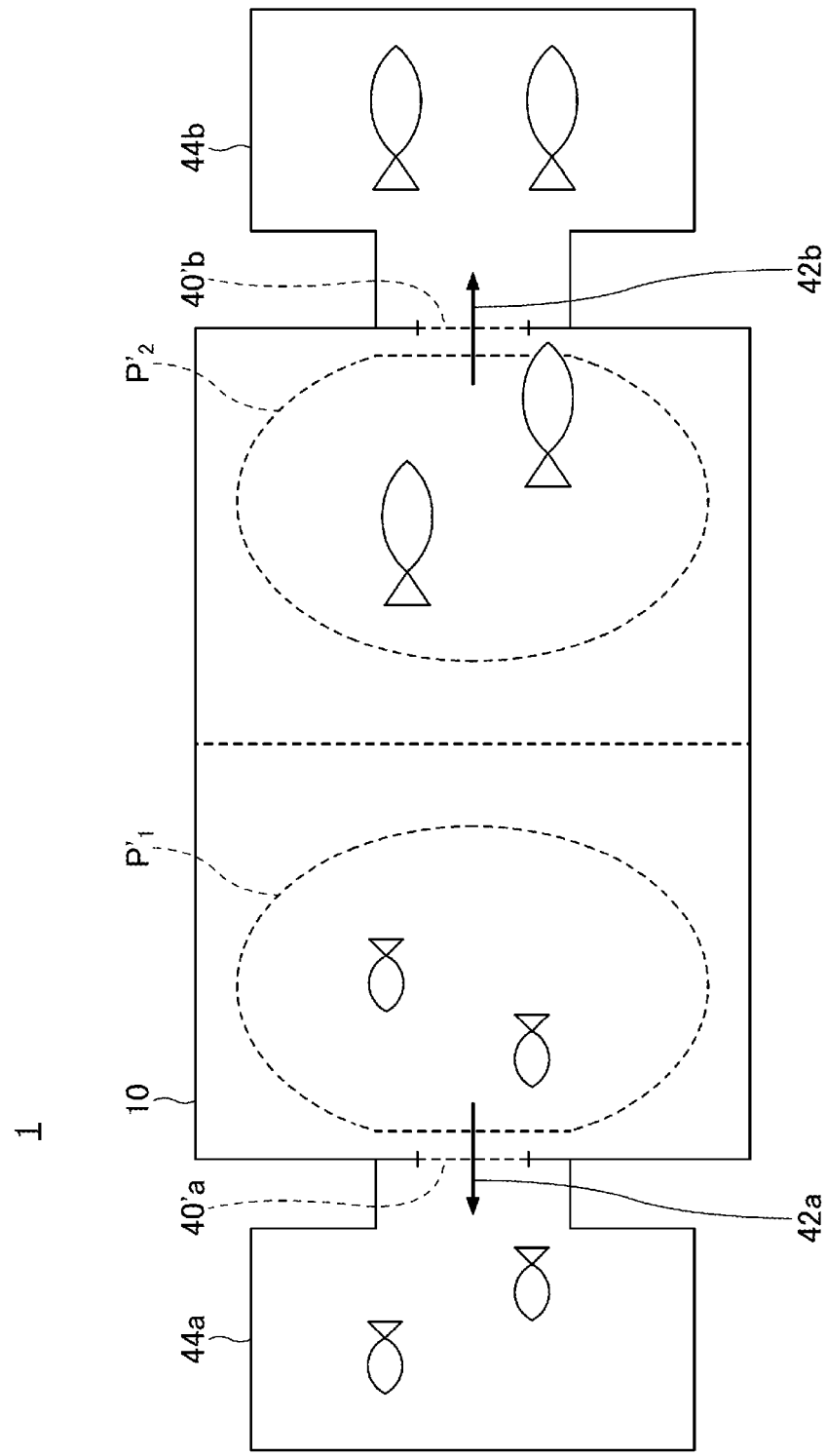
FIG. 5 is a figure schematically illustrating a configuration of an apparatus according to another embodiment of the present invention.

FIG. 5 is a plan view illustrating another embodiment according to the present invention. The present embodiments different from the embodiment of FIG. 1 and FIG. 2 mainly in the driving-out unit, and other portions such as the controller, the electrodes, and the like are the same or similar. For the sake of ease of understanding, the same or similar portions are omitted. Hereinafter, portions different from the above embodiment are described below. In the following explanation, constituent elements that are the same as or similar to the constituent elements illustrated in FIG. 1 to FIG. 4 are denoted with the same reference numerals.

In the present embodiment, the driving-out units 40'a and 40'b are configured as opening units, and are provided on a side wall of the container 10. Preferably, the opening unit includes an openable shutter (indicated by a broken line in FIG. 5) that can watertightly seal the opening unit. When aquatic organisms to be sorted (indicated as fish) is put into the container 10, an electric field similar to what has been explained with reference to FIG. 1 to FIG. 3 is formed, and aquatic organisms having different characteristics move to different portions P'1 and P'2. After moving, the apparatus 1 opens the shutters of the driving-out units 40'a and 40'b, and the aquatic organisms are driven through the openings of the driving-out units 40'a and 40'b to the outside of the container 10. On the downstream of the driving-out units 40'a and 40'b, individual receiving containers 44a and 44b for receiving the sorted aquatic organisms are connected, which can be brought into communication with or blocked from the container 10 in accordance with the opening and closing of the shutters of the driving-out units 40'a and 40'b.

The shutters of the driving-out units 40'a and 40'b are openable, such that when closed, the shutters become watertight so as not to allow water and aquatic organisms to pass through, and when opened, the shutters bring the container 10 and the receiving containers 44a and 44b into communication with each other so as to allow water and aquatic organism to move therethrough. The driving-out units 40'a and 40'b are connected to the controller 30, and are configured to be able to perform an opening and closing operation in accordance with a command signal from the controller 30. The shutter may be a physical shutter member in the shape of a plate or a diaphragm that opens and closes by slide or rotation. Alternatively or in addition, an electric field formed accordingly with the use of the above electric pulse can also be used as a shutter. According to the shutter achieved with the electric field, when closed, i.e., when art electric field is formed, only the passage of aquatic organisms is blocked, and water is allowed to pass through. Therefore, the stress on the aquatic organisms due to the change of water can be reduced.

When the shutter's of the driving-out units 40'a and 40'b are opened, the controller 30 adjusts the electric fields forming the non-electric field areas P'1 and P'2 as follows. Specifically, the non-electric field areas P'1 and P'2 gradually approach the driving-out units 40'a and 40'b and when the non-electric field areas P'1 and P'2 reach the openings of the driving-out units 40'a and 40'b (portions where the shutters are opened), the non-electric field areas P'1 and P'2 gradually decrease toward the driving-out units 40'a and 40'b. In this case, the already sorted aquatic organisms that are already in the respective non-electric field areas P'1 and P'2 attempt to stay within the non-electric field areas P'1 and P'2, and therefore, the already sorted aquatic organisms are moved together with the movement of the non-electric field areas P'1 and P'2. Accordingly, the already sorted aquatic organisms are moved to the respectively corresponding receiving containers 44a and 44b according to the directions of arrows 42a and 42b and are driven out of the container 10. When the driving of the aquatic organisms from the container 10 to the receiving containers 44a and 44b has been finished, the shutters of the driving-out units 40'a and 40'b are closed again, and the corresponding shutters of the receiving containers 44a and 44b are also closed.

Although the driving-out units 40'a and 40'b are shown on the side walls of the container 10 in FIG. 5, the driving-out units 40'a and 40'b can be provided on the bottom surface of the container 10. In proximity to the shutters of the driving-out units 40'a and 40'b and in proximity to the opening when the shutters are opened, an electric field may be formed in order to prevent aquatic organisms from collision.

As another aspect of a driving-out unit, for example, after aquatic organisms are sorted, a plate-shaped member that physically partitions the container 10 may be inserted between the area P1 and the area P2 in the container 10, i.e., a portion corresponding to a broken line indicated around the center of the container 10 in FIG. 5, so that respective aquatic organisms can be driven out according to discharge of water from the area P1 and the area P2. For example, a side surface of the container 10 corresponding to the long side indicated in FIG. 3A, FIG. 3B, and FIG. 5, i.e., a side surface facing both of the areas P1 and P2, may be partially or entirely opened, so that sorted aquatic organisms can be simultaneously or successively driven out to separate receiving containers outside of the container 10. Alternatively, a surface that is partially or entirely opened may be a side surface of the container corresponding to the short side indicated in FIG. 3A, FIG. 3B, and FIG. 5, i.e., a side surface facing only one of the area P1 and the area P2. The above opening of the side surface may be achieved by sliding the side surface upward or downward, or rotating the side surface about one side as an axis or about multiple sides as axes (a single-sided door or double doors). When a lower portion of the side surface is configured to be opened, aquatic organisms can be driven out according to the flow of water discharged through the lower portion. In this case, when the container 10 is inclined or the bottom surface is inclined in order to promote water to flow out toward the openings of the driving-out units 40'a and 40'b, aquatic organisms can be smoothly driven out according to the flow of water.

As still another embodiment of the driving-out unit, a fish pump for sucking in and transferring fish together with water may be used. The intake port of the fish pump is provided at the position corresponding to the non-electric field area, and after aquatic organisms are sorted, the pump is turned ON, so that the aquatic organisms moved to the corresponding position are sucked in and driven out to the outside of the container 10.

Alternatively, instead of the embodiment using the net as described above, the driving-out unit may employ a pouch capable of scooping and capturing aquatic organisms together with water and driving out the aquatic organisms to the outside of the container 10. Depending on the type of aquatic organisms in question, various configurations capable of driving out sorted aquatic organisms to the outside of the container 10 may be adopted as the technique for driving out.

Further, the apparatus 1 may include, as the driving-out unit, all of the multiple forms (the net, the opening, the fish pump, the pouch, and the like) explained above as examples, and depending on the type of aquatic organisms to be sorted or a user's command that is input through the operation unit or the like, one or more configurations may be selected and activated from among the provided configurations. Also, driving-out units of multiple different forms as explained above may be provided at multiple different positions in the container 10, and according to a driving-out unit to be used, portions corresponding to characteristics (the areas P1 and P2), which are destinations to which aquatic organisms to be sorted are moved, may be provided. For example, as multiple driving-out units, some of the forms including (multiple) forms of nets, (multiple) forms of openings, (multiple) forms of fish pumps, and (multiple) forms of pouches, may be provided in the container 10, and when fish are classified into larger fish and smaller fish, it may be possible to, e.g., provide the area P1 at the position of a pouch a for the larger fish, and provide the area P2 at the position of a fish pump b for the smaller fish.

Although the embodiments of FIG. 1 to FIG. 5 show examples in which the container 10 is partitioned into two areas arranged side by side in the horizontal direction, i.e., into the right and left in the drawing, and aquatic organisms are classified into respective sections, the present invention is not limited thereto. Note that the number of sections correspond to the number of electric fields that are different in the first parameter, and non-electric field areas are formed in the sections corresponding to the respective electric fields. For example, the number of sections, i.e., the number of corresponding electric fields with different parameters, may be any number so long as it is two or more. The shapes of the sections and the non-electric field areas are not limited to circles and quadrangles, and may be any shape. For example, when a container is in a cylindrical shape, the container can also be partitioned radially from the center axis into fan shapes.

Also, the space inside the container can be partitioned not only in the horizontal direction but also in the vertical direction, i.e., partitioned into layers that overlap vertically. In a case where the container is attempted to be partitioned in the vertical direction, it is preferable to use an electrode arrangement in which multiple electrodes are arranged in the vertical direction. In this case, for example, driving-out units can be provided at different positions in the depth direction. In this case, when, after aquatic organisms are sorted, a plate material that physically partitions the inside of the container is inserted in an inclined manner according to the height of the driving-out unit on the upper side, and an openable drive-out port is provided in proximity to the lower side of the inclined plate material, aquatic organisms can be smoothly driven out according to the flow of water. The non-electric field area does not have to be a circular shape, and may be in any shape so long as an electrode pair is selected in any way as appropriate.

Further, although the drive-out operations of the driving-out units 40a, 40b, 40'a, and 40"b are triggered by command signals from the controller 30 after aquatic organisms have been sorted, the controller 30 can identify the finishing time of the sorting of aquatic organisms as follows. For example, an elapse of a preconfigured time from the start of application of the electric pulse may be detected, and this may deemed as completion of the sorting of aquatic organisms. Alternatively, the apparatus 1 may be further provided with image-capturing means such as a camera for capturing an image of the inside of the container 10, and the completion of the sorting can be detected by performing image analysis of the image of the inside of the container captured by the image-capturing means. Alternatively, when it is detected that the ON/OFF switch is operated again while an electric pulse is applied to an electrode, this may deemed as completion of the sorting of aquatic organisms. Also, whether sorting of aquatic organisms has been finished can be determined by estimating the positions of aquatic organisms by measuring the impedance and/or the distribution inside the container with the use of the electrodes 20 provided in the container 10 or other electrodes and detecting whether the aquatic organisms gather at the corresponding areas P1 and P2. Whether the sorting of aquatic organisms has been finished, i.e., whether aquatic organisms to be sorted have moved to corresponding portions (the areas P1 and P2 and the like), can be determined by detecting the positions of the aquatic organisms in the container 10 and determining whether the positions are within or in proximity to the respective portions (the areas P1 and P2) according to the characteristics. In addition to the methods described above, various methods using light, heat, sound waves, electricity, magnetism, and the like can be adopted for the detection of the positions of the aquatic organisms.

The constituent elements of one of the multiple embodiments described above can be combined with the constituent elements described in another embodiment within the subject matter of the present invention, even if not specifically described.

What is claimed is:

1. An apparatus for sorting aquatic organisms, the respective aquatic organisms having different characteristics, wherein the sorting is in accordance with the different characteristics, the apparatus comprising:

a container configured to contain the aquatic organisms and water;

a plurality of electrodes provided in the container;

a controller for controlling electric pulses applied to one or more electrodes of the plurality of electrodes; and a driving-out unit for driving out the aquatic organisms having been sorted, wherein the electric pulses controlled by the controller are applied to the one or more electrodes to form an electric field so as to selectively move the aquatic organisms in the container to a different portion in the container according to the characteristics, the driving-out unit drives out the aquatic organisms to an outside of the container from the portion according to the characteristics, after the aquatic organisms are moved, the controller applies the electric pulses to the plurality of electrodes to which the electric pulses are to be applied, so that a first electric field and a second electric field of at least two types of electric fields that are different in a first parameter are formed in an overlapping manner in the container while simultaneously the first and second electric fields respectively have a second parameter distributed in a mutually different manner in the container than as in the first parameter, the first parameter being a parameter of an electric field from which different reactions are made by the aquatic organisms having the different characteristics such that the different characteristics serve as an index of sorting.

2. The apparatus according to claim 1, wherein the characteristics include at least one of a size and a type of the aquatic organisms.

3. The apparatus according to claim 1, wherein the driving-out unit comprises at least one of a net or a pouch scooping and capturing the aquatic organisms; an opening provided in the container; or a pump sucking in the aquatic organisms.

4. The apparatus according to claim 1, wherein the first parameter includes at least one of a waveform, a frequency, and a duty ratio, and
the second parameter includes at least an intensity.

5. The apparatus according to claim 1, wherein the controller further includes an operation unit for transmitting a command signal for adjusting the electric pulses applied to the plurality of electrodes.

6. The apparatus according to claim 5, wherein the operation unit is provided with command units associated with respectively different portions in the container.

7. The apparatus according to claim 1, further comprising a display unit indicating whether the electric pulses are applied to the plurality of electrodes.

8. The apparatus according to claim 1, wherein the driving-out unit starts to drive out the aquatic organisms after a predetermined period of time passes since start of an application of the electric pulses to the plurality of electrodes.

9. The apparatus according to claim 1, wherein a first non-electric field area and a second non-electric field area respectively defined by the at least two types of electric fields shrink over a period of time.

* * * * *